United States Patent Office 3,309,277
Patented Mar. 14, 1967

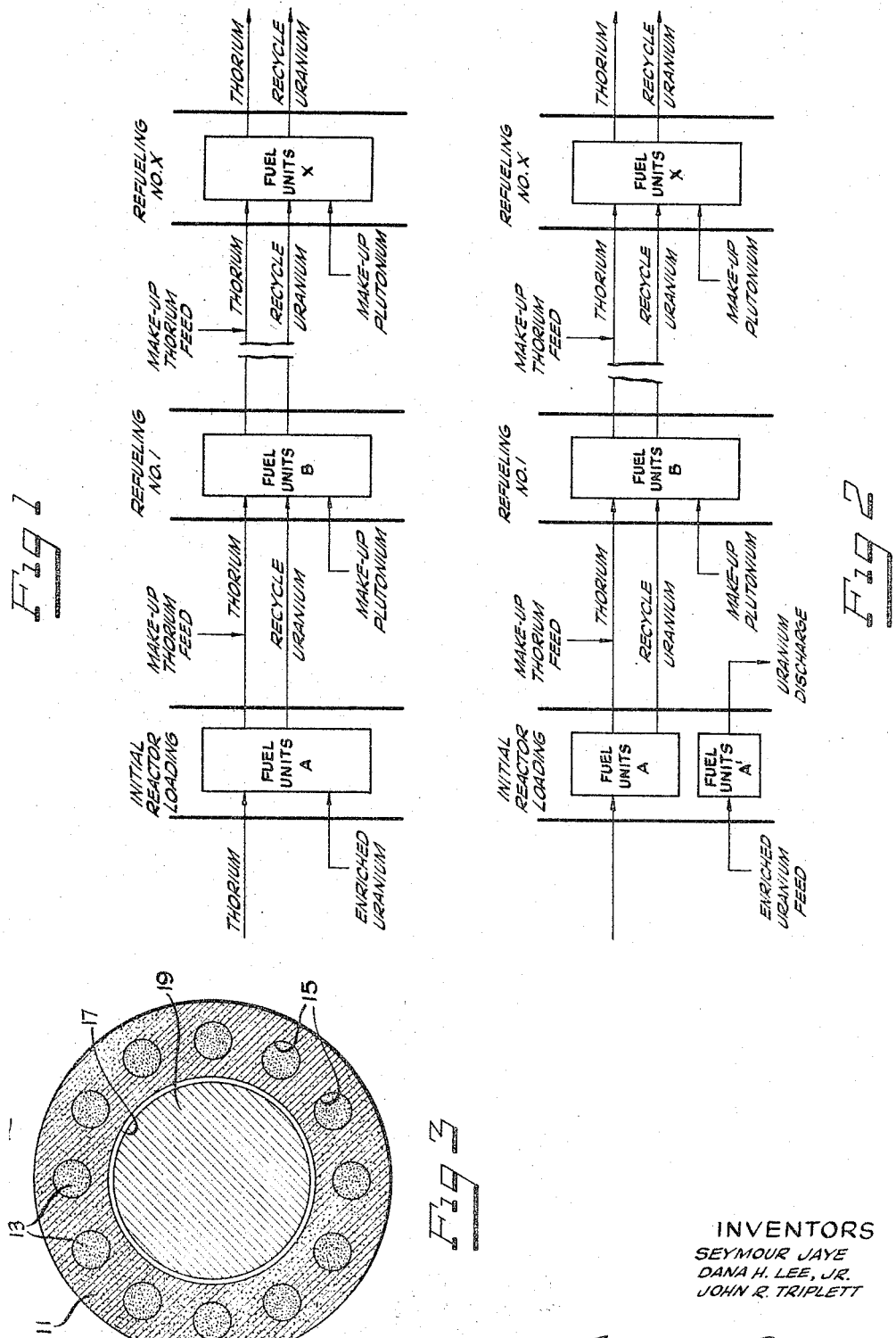

3,309,277
NUCLEAR REACTOR AND METHOD OF FUEL MANAGEMENT THEREFOR
Seymour Jaye and Dana H. Lee, Jr., Solana Beach, and John R. Triplett, Rancho Santa Fe, Calif., assignors, by mesne assignments, to the United States of America as represented by the United States Atomic Energy Commission
Filed May 17, 1965, Ser. No. 456,583
7 Claims. (Cl. 176—16)

This invention relates to nuclear reactors, and more particularly it relates to the operation of a nuclear reactor utilizing a thorium-uranium$^{233}$ breeding cycle.

In power reactors which are designed to produce useful power, as for example steam for the generation of electricity, the cost of nuclear fuel plays an important part in the economics of reactor operation. Because of the relatively high cost of nuclear fuels, considerable interest has fairly recently been paid to power-breeder reactors. These reactors, in addition to producing useful power, simultaneously produce fissionable material from fertile material.

The ratio of fissionable atoms created from the fertile material for each fissionable atom consumed in a nuclear reactor is termed the conversion ratio of the reactor. If a reactor had a conversion ratio of 1.0, it would produce as much new fissionable material as it would use and would be termed a breeder. Because fertile material is a relatively inexpensive commodity, such a reactor may be economically of great value from a strictly nuclear aspect.

Under favorable conditions, the fissioning of fissionable materials $U^{233}$, $U^{235}$ and $Pu^{239}$ produce an average of two or more neutrons for every fissionable atom which is consumed. Because only one neutron is needed to propagate a self-sustaining nuclear reaction, power-breeder reactors using these nuclear fuels can potentially produce as much fissionable fuel as they burn.

The thorium-uranium$^{233}$ fuel cycle appears especially promising for power-breeder reactor operation. Naturally occurring thorium is in the form of isotope $Th^{232}$. This isotope is fertile, having a high tendency to capture a neutron and become thorium$^{233}$. $Th^{233}$ decays by two successive beta particle emissions to become $U^{233}$. $U^{233}$ is fissionable and is considered excellently suited for the propagation of the power-breeding cycle. $U^{233}$ has a very high fission cross section to neutrons in the thermal and epithermal range. Moreover, when a $U^{233}$ atom is consumed, an average of about 2.27 neutrons are produced, thus providing an average of 1.27 neutrons per fissionable atom consumed for potentially causing transmutation of another fertile thorium atom into a fissionable atom.

In advanced reactor systems which are capable of operating on a thorium-uranium fuel breeding cycle, the energy produced in the reactor comes principally from the fission of atoms of $U^{233}$. One example of a reactor type capable of being designed so as to operate in the manner contemplated by the present invention is a high temperature, graphite moderated, gas-cooled reactor system. One embodiment of such a system is described in Nucleonics, volume 18, No. 1, January 1960. In such a reactor system, it is desirable to use as many of the excess neutrons as possible to produce additional $U^{233}$ from the thorium.

For a nuclear reactor operating in the thermal and epithermal range, $U^{233}$ is preferred as a fuel over $U^{235}$ because the number of neutrons released per fissile nuclide destroyed ($\eta$) is significantly larger for $U^{233}$ than for $U^{235}$. However, because $U^{233}$ is not available naturally, the initial reactor charge usually contains a naturally occurring element, such as $U^{235}$. Furthermore, because conversion ratios as high as unity (1.0) have not yet been economically achieved in power-breeder reactors, some make-up nuclear fuel must also be added periodically during the operating life of the reactor.

A power reactor is generally operated no longer than the efficient life of the fuel within it, i.e., until the excess reactivity of the reactor core drops to an undesirably low level. At this time, the fuel elements are removed from the reactor core and replaced with fresh fuel elements. Alternately, a certain selected portion or percentage of the total fuel elements in the core may be removed each year, or other suitable time period, so that the reactor is periodically refueled without any major shutdown to refuel the entire core.

When fuel elements are removed from the reactor, they are generally reprocessed to chemically separate the uranium from the thorium, the fission products, the diluent and the cladding (if present). The separated uranium is available to be refabricated into new fuel elements and subsequently recycled in the same reactor core or in another reactor. For example, if the maximum efficient life of certain fuel elements for a reactor operating on a thorium-uranium fuel cycle is considered to be about 6 years, then one-sixth of the elements might be removed each year and replaced. The non-fissioned uranium and the uranium bred in the thorium, which are recovered by reprocessing, might be refabricated into new fuel elements to replace the fuel elements to be removed from the reactor the following year.

In order to keep fabrication costs at a reasonably low level, it is often planned that the operating life of the fuel element will be equal to the period of power generation it takes for at least about 90 percent of the fissile nuclides originally in the fuel elements to undergo nuclear reactions. Therefore, at the end of the planned life span of a fuel element operating on a thorium-uranium fuel cycle, less than 10 percent of the original $U^{235}$ will remain as that isotope. Thus, the majority of the fissile uranium which is recovered in reprocessing consists of $U^{233}$ which was bred from the fertile thorium in the reactor core. Because conversion factors as great as 1.0 are not yet achieved in power-breeder reactors, some make-up enriched uranium is added to the reprocessed uranium so that the refabricated fuel elements each contain the desired amount of fissile material.

As the reactor is continually operated for repeated fuel cycles and fresh $U^{235}$ is added to maintain the desired reactivity level within the reactor core, the concentration of heavy nuclides, i.e., $U^{236}$ and $Np^{237}$, increases in the reactor core because the $U^{236}$ cannot be separated chemically from the desirable $U^{233}$. Accordingly, the parasitic neutron absorptions associated with these heavy nuclides further and further reduce the conversion ratio of the reactor. Therefore, limitation of the build-up of these heavy nuclide poisons is desirable.

In U.S. Patent 3,208,912 in the name of Seymour Jaye and Dana H. Lee, Jr. a method of fuel management for a power-breeder reactor operating on a uranium-thorium fuel cycle is disclosed. In this method of fuel management it is shown that by segregating the fertile thorium from at least part of the enriched uranium fuel in a nuclear reactor utilizing a thorium-uranium fuel cycle, heavy nuclide poisons can be easily, periodically removed, and the build-up of heavy nuclide parasitic neutron absorbers is kept at an acceptively low level. The fertile thorium is preferably segregated from the fissile enriched uranim in the loading of the nuclear reactor operating so that at the end of planned operative life of a fuel element, the segregation of the fuel facilitates the separation of the $U^{233}$ bred during the reactor cycle from the nonfissioned uranium $U^{233}$ and $U^{235}$ contained in the fuel at the beginning of the cycle. Various ways of accomplishing segregation of the fuel are disclosed, such as placing different fuel units of uranium and of thorium in separate fuel elements, placing different fuel units in separate sections of the same fuel element, or using different size fuel particles or different coatings for the different fuel units.

Although the above-described method of fuel management is very effective, it contemplates the continued use of fairly highly enriched uranium make-up in subsequent fuel loadings of the nuclear reactor. Other fuel management programs are desired which take advantage of nuclear fuel other than fairly highly enriched uranium.

It is a principal object of the present invention to provide an efficient operating nuclear reactor utilizing a thorium-uranium fuel cycle. It is another object to provide a method of fuel management for a nuclear reactor which conserves enriched uranium. It is a further object to provide a method for operating a power-near breeder nuclear reactor effectively and economically without requiring enriched uranium make-up fuel. Still another object is to provide a gas-cooled power-near breeder reactor using ceramic fuel elements which does not require enriched uranium for refuelings. These and other objects of the invention are more particularly set forth in the following detailed description and in the accompanying drawings wherein:

FIGURE 1 is a diagrammatic view of a method of managing fuel for a nuclear reactor embodying various features of the present invention;

FIGURE 2 is a diagrammatic view of an alternate method to that shown in FIGURE 1; and FIGURE 3 is a cross-sectional view through a fuel element useful in a reactor operating on the above methods.

It has been found that once a power-near breeder nuclear reactor operating on an initial loading of fairly highly enriched uranium and thorium has approached equilibrium conditions, plutonium can be used to provide the needed fissionable nuclear fuel for subsequent reactor core loadings. Plutonium is becoming increasingly more available and presents an attractive alternative to enriched uranium in a reactor of this type. Moreover, the substitution of plutonium for enriched uranium is a measure which affords conservation of the world supply of enriched uranium which may prove of considerable importance in the face of the prospective increasing demands which are expected with the advent of wider uses of nuclear energy.

Plutonium, especially discharge plutonium from various converter reactors, does not exhibit a particularly large eta (neutron production ratio), i.e., usually about 1.9, in the neutron energy spectrum which prevails in a uranium-thorium power-breeder reactor. One reason is that discharge plutonium, in addition to the most desirable isotope $Pu^{239}$, often carries other isotopes with it, e.g., the composition may be 78 percent $Pu^{239}$, 17 percent $Pu^{240}$, 5 percent $Pu^{241}$. Furthermore, the eta has a tendency to decrease rapidly as the spectrum hardens with increasing plutonium concentration in a nuclear reactor core. However, it has been found that, by carefully regulating the ratio of moderator to fertile thorium, plutonium may be effectviely employed as the make-up fissile material in a nuclear reactor operating on a uranium-thorium fuel cycle. By using a nonuniform reactor core enrichment, such as zone enrichment, through the use of plutonium as make-up to provide the necessary fuel enrichment, the utilization of plutonium is feasible as a substitute for highly enriched uranium.

In a power-breeder reactor of this type, the conversion ratio of fertile thorium to fissile $U^{233}$ is of definite importance. Refueling of such a power-breeder reactor is contemplated on the basis of a portion of the core at a time, a fraction of the total fuel elements being replaced each time. After the reactor core has reached equilibrium and subsequent refueling with fuel elements containing plutonium as make-up fuel, the majority of the power from the reactor is produced by the $U^{233}$. Accordingly, the conversion ratio should be maintained at at least about 0.75 and preferably at at least about 0.80. By carefully regulating the moderator to thorium ratio, it has been found that achievement of such conversion ratios, and even conversion ratios above 0.90, is practical.

Although the conversion ratio is dependent upon the ratio of moderator-thorium, there are various economic considerations which must be taken into account in the selection of the particular moderator-thorium ratio for a given reactor. One of these is the amount of plutonium that will be required for a particular loading to provide the needed fuel enrichment and another consideration, actually interdependent on the first, is the length of feasible fuel residence.

There are, of course, various technical considerations which must also be taken into account in the use of plutonium as a make-up fuel in the above-described reactor. Many of these technical considerations are of the type which are well within the skill of the art to determine once the desired criteria are set, such as type of fuel particles and composition thereof, fuel element construction, location of thorium, plutonium, uranium and moderator in the individual fuel elements, etc. One other consideration to be noted is the age peaking factor. The age peaking factor is defined as the ratio of the fission rate in freshly loaded fuel relative to the fission rate in fuel of average exposure in the average reactor core flux. The use of too light a fuel loading, i.e., too high a ratio of moderator to thorium in order to accommodate a lesser amount of plutonium make-up, might be prohibited by an excessively large age peaking factor which would result. However, it is considered that age peaking factors from about 1.3 to about 1.4 can be accommodated without introducing undesirable problems into reactor core operation. Moreover, the conversion ratio will also be influenced by the retention of fission product poisons within the fuel elements versus the removal of fission products by release into the coolant stream followed by removal from the coolant in an external trapping system. However, a feasible conversion ratio can be effected with either method of handling the fission products.

The invention is hereinafter described with reference to the high temperature gas-cooled reactor (HTGR) to which reference has been hereinbefore made. In this reactor, all of the moderator is contained in the fuel elements themselves although other equivalent arrangements might be employed. Various designs of fuel elements may be used to contain the all ceramic fuel and the ceramic moderator system used in such a reactor. For purposes of description however, reference is hereinafter made to a particular fuel element configuration which is disclosed in U.S. Patent 3,274,068 in the names of Stanley L. Koutz and Richard F. Turner, entitled "Fuel Element" and assigned to the assignee of this application. The construction of this particular fuel element is described in detail in this application. A cross section view through the active length of the fuel element is shown in FIGURE 3.

Briefly, this fuel element comprises a cylinder 11 of graphite of a density of about 1.8 grams per cc. that is 11.8 cm. in diameter. Nuclear fuel material 13 is contained in fourteen fuel holes 15 evenly spaced in an annular fuel region, which holes 15 are about 1.3 cm. in diameter. When an entire graphite moderator is employed, the fuel element cylinder 11 is solid except for these fuel holes 15. When a composite beryllium and graphite ceramic moderator is employed, a concentric hole 17 is bored centrally through the graphite cylinder 11 to accommodate a spine 19 of beryllium containing material. In the illustrated fuel element, a central hole 17 having a 6.8 cm. diameter is provided. The beryllium is preferably provided in the form of sintered compacts of beryllium oxide, although other ceramic beryllium compounds, such as beryllium carbide, or other physical forms of beryllium material, such as powder, may also be employed. Regulation of the density of the central beryllium moderator affords one way to regulate the ratio between the moderator and the thorium contained in the nuclear fuel material 13 in the fuel holes 15.

Although the fuel material 13 is preferably in particulate form, other types of fuel, such as fuel in powdered or compact form may be employed. The fuel may be in the form of uranium, thorium, and plutonium, carbide, oxide or other suitable ceramic compound. Either coated or uncoated fuel particles may be employed depending primarily upon whether retention of the fission products within the fuel particles is desired.

For purposes of description, a 1000 mw. (e) HTGR reactor system is hereinafter considered which employs about 5500 fuel elements of the above-described configuration each of which has an overall length of about 6.1 meters and an active fueled length of about 4.7 meters. These fuel elements are arranged in a hexagonal array on a 11.9 cm. pitch. Helium under a pressure of about 450 p.s.i. is circulated longitudinally through the interspaces between adjacent fuel elements and removes the heat generated within the fuel elements from the outer surfaces of the cylindrical graphite bodies. Operation to provide a coolant exit temperature about 1500° F. is contemplated.

Typically, in the initial loading of the reactor core, 2300 kg. of uranium having an enrichment of about 93 percent is employed. Fertile thorium in an amount of about 38,500 kg. is employed. Preferably, uranium and thorium carbides are used in particulate form. Either composite particles of uranium and thorium may be used, as diagrammatically illustrated in FIGURE 1, or separate particles of uranium carbide and thorium carbide, as diagrammatically illustrated in FIGURE 2, are employed. The latter arrangement of segregated fuel units permits the removal, after the initial cycle of a fuel element in the reactor, of the remainder of the enriched uranium and thereby avoids the build-up of heavy nuclide poisons, as previously described with reference to U.S. application Serial No. 384,012, now Patent No. 3,208,912.

As previously stated, it has been found that after the reactor core has approached equilibrium operation and time for refueling a portion of the reactor core has arrived, by close regulation of the ratio of moderator to thorium, plutonium may be used in the replacement fuel elements to provide the make-up enrichment needed. To simplify this regulation of the moderator-thorium ratio, it is preferable that the desired ratio of moderator to thorium is employed in the initial reactor core loading. However, slightly different ratios can be employed in the initial reactor core loading so long as the replacement fuel elements contain the proper proportions of moderator to thorium so that the core as a whole, after replacement, has the desired moderator to thorium ratio.

In a power-near breeder reactor of the above-described type, operating with a ceramic moderator and ceramic fuel and employing the substantially wholly graphite fuel element bodies described above, the ratio of carbon to thorium should be between about 125 atoms of carbon per atom of thorium and about 250 atoms of carbon per atom of thorium, in order to facilitate the use of plutonium make-up. Within this range of ratios, the precise ratio to be employed in a particular reactor is selected upon the interdependent variables as to residence time and amount of enrichment per refueling to which reference has been made hereinbefore. With maintenance of this moderator to thorium ratio within the above range, it is found that plutonium, even discharge plutonium carrying with it other isotopes in addition to $Pu^{239}$, may be employed to provide the make-up enrichment needed to continue reactor operation with a conversion ratio at at least about 0.75. In these calculations of moderator to thorium, the carbon contained within the fuel elements, in addition to the graphite body of the element, is considered, such as the carbon which is present if carbide fuel is employed or if pyrolytic carbon coatings are used on fuel particles; however, it can be seen that these rather minor amounts of carbon have fairly small influence upon the total ratio in the ranges stated above.

Instead of the graphite fuel element body considered above, a fuel element containing a spine of beryllium material may be alternately employed, such as that illustrated in FIGURE 3, to take advantage of the desirable aspects of beryllium moderation in a ceramic fuel-moderator system. For purposes of setting forth the range of moderator to thorium ratio which makes practical such a composite ceramic moderator of beryllium and carbon, reference is made to the particular fuel element configuration shown in FIGURE 3 for which the dimensions have been hereinbefore set forth. Obviously, if a different volumetric proportion of beryllium material in the fuel element to graphite in the fuel element body is employed, as by changing the size of the fuel element body, or the size of the diameter of the spine, or by changing other relative dimensions, the ratio of beryllium to thorium would be proportionately different from that which is set forth hereinafter. However, based upon the data set forth in this application, it is well within the ability of one skilled in this art to simply calculate the proportionate change which would be dictated.

It has been found that when such composite ceramic fuel elements utilizing both ceramic beryllium material and graphite are employed in the respective dimensions set forth above, plutonium can be successfully utilized to provide the make-up enrichment needed in replacement fuel elements so long as the ratio of beryllium to thorium is maintained between about 25 atoms of beryllium to 1 atom of thorium and about 55 atoms of beryllium to 1 atom of thorium. These calculations are based upon a composite moderator inter-relationship of about 5 atoms graphite for each 2 atoms of beryllium as is the case in the above-described fuel element which utilizes a graphite body of a density of about 1.8 grams per cc.

The following examples illustrate two operating nuclear reactor fuel management programs which function satisfactorily using plutonium make-up. It should be understood that these examples are for purposes of illustration only and do not themselves limit the invention, the scope of which is defined in the claims appearing at the end of this specification.

*Example I*

A program of fuel management for the above described 1000 mw. (e) HTGR operating on a thorium-uranium fuel cycle is diagrammatically illustrated in FIGURE 1. In this program, the thorium and the enriched uranium in the initial charge to the reactor are indiscriminately included in the same fuel units. Graphite moderator ceramic fuel elements are employed in the amount and configuration set forth above.

The initial fuel elements are charged with pyrolytic carbon coated particles of uranium-thorium carbide. The density of the packed bed of fuel and the uranium to thorium ratio is adjusted so that the carbon to thorium ratio in the fuel elements which make up the reactor core is about 200 carbon atoms to 1 thorium atom. A four-year refueling cycle is employed with about one-fourth of the fuel elements being replaced each year.

At the end of the first two years, about one-eighth of the fuel elements are removed and the fuel charge in these fuel elements is reprocessed as a single mass to separate the uranium from the thorium and from the lighter fission products. The thorium is recovered if desired. Make-up plutonium in the form of about 100 kg. of discharge plutonium having the previously stated isotope percentage is added to the recovered uranium to constitute the fissile material for the replacement fuel elements. The uranium and plutonium are used in carbide form. Either all fresh thorium or make-up fresh thorium plus reprocessed thorium is included in the fuel units to provide the fertile nuclides. The carbon to thorium ratio in the replacement fuel elements is about 200 to 1. This process is repeated at half year intervals. The replacement fuel elements have an age peaking factor of about 1.45 which is acceptable.

Throughout this initial five and one-half-year period, the reactor operates in the desired manner. After the eighth replacement of fuel elements is completed, all of the fuel elements in the reactor core contain make-up plutonium, and the reactor continues to operate as desired. Calculations show that a conversion ratio of about 0.78 is being achieved. It is also shown that the f.i.f.a. (fissions per initial fissile atom) is about 1.2.

Operation of the HTGR on these graphite fuel elements which contain make-up enrichment in the form of discharge plutonium is considered to be fully satisfactory. Useful power is generated by this reactor at a cost of about 0.9 mil per kilowatt-hour, based upon projected 1975 cost figures.

*Example II*

Another program of fuel management for the above-described 1000 mw. (e) HTGR operating on a thorium-uranium breeding cycle is diagrammatically illustrated in FIGURE 2. This program utilizes the composite-moderator ceramic fuel elements illustrated in FIGURE 3, for which the dimensions have been hereinbefore set forth. The same number and arrangement of fuel elements are employed as in Example I.

The initial fuel elements are charged with pyrolytic carbon coated fuel particles disposed in a packed bed in each of the fuel holes. The density of the packed bed of fuel, the uranium to thorium ratio, and the density of the beryllium oxide spine are adjusted so that the beryllium to thorium ratio in these fuel elements which make up the reactor core is about 44 atoms of beryllium to each thorium atom. The graphite in the fuel element body and the carbon in the fuel provides about 5 atoms of carbon for each two beryllium atoms. A five-year residence time is employed with about one-tenth of the total fuel elements being replaced each half year.

In this fuel management program, the initial fuel charge to the reactor comprises two groups of segregated fuel units of different compositions. Separate particles of thorium carbide and uranium carbide are employed, the thorium carbide particles being larger in size to facilitate later separation. The group of fuel units labeled A contain the fertile thorium. The group of units labeled A' contain the enriched uranium, i.e., about 93 percent enrichment.

At the end of the first two years, about one-tenth of the total fuel elements are removed from the reactor. The A fuel units are suitably separated from the A' fuel units and are reprocessed separately. The bred uranium in the A fuel units, produced from the fertile thorium, is primarily $U^{233}$. This bred uranium is separated from the thorium, the neptunium and the fission products and is ready for use in a subsequent reactor cycle. The thorium may also be recovered if desired. Fuel units A' are treated to reclaim the fissile uranium which was not consumed during the reactor cycle. This uranium is either sold or is designated for use in a different type of reactor. Operation in this manner avoids carrying the heavy nuclide poisons, resulting from neutron capture by $U^{235}$, into subsequent reactor cycles.

In each of the replacement fuel elements, make-up plutonium is added to the bred uranium to provide the needed fissile material. For each replacement of one-tenth of the fuel elements in the core, about 70 kg. of discharge plutonium, having the previously stated isotope percentage, is employed. Either all fresh thorium, or make-up fresh thorium plus reprocessed thorium, is included in the fuel elements to provide the fertile nuclides. The uranium, plutonium and thorium are used in carbide form. No attempt is made to segregate the fuel in the replacement fuel elements inasmuch as thorium, uranium and plutonium are chemically separable in reprocessing. The beryllium to thorium ratio in the replacement fuel elements is likewise maintained at about 44 to 1. The replacement fuel elements have an age peaking factor of about 1.38 which is considered acceptable. This process of fuel element replacement is repeated at half year intervals.

Throughout this initial six and one-half year period, the reactor operates in the desired manner. After the tenth replacement of fuel elements is completed, all of the fuel elements in the reactor core contain make-up plutonium, and the reactor continues to operate at equilibrium conditions as desired. Calculations show that a conversion ratio of about 0.85 is achieved. It is also shown that the f.i.f.a. is about 1.5.

Operation of the HTGR on these composite ceramic moderator fuel elements which contain make-up enrichment in the form of discharge plutonium is considered to be fully satisfactory. Useful power is generated by this reactor at a cost of about 1.0 mil per kilowatt hour, based upon projected 1975 cost figures.

The invention provides a very flexible method of operating a nuclear reactor utilizing a thorium-uranium breeding cycle inasmuch as it allows the reactor to be operated on fuel recycles utilizing make-up enrichment in the form of either discharge plutonium or enriched uranium as the economic choice at the time, or other considerations, may dictate. Moreover, the invention makes feasible long range conservation of enriched uranium.

Various of the features of the invention are set forth in the following claims.

What is claimed is:

1. A method of fuel management for a nuclear reactor utilizing a thorium-uranium$^{233}$ breeding cycle for a plurality of fuel recycles, which method comprises charging the reactor with fuel units containing uranium and thorium, operating the reactor for the desired reactivity life of at least a selected portion of said fuel units, removing said selected portion of fuel units from the nuclear reactor, reprocessing said selected fuel units to eliminate fission products and to recover bred uranium, and refueling the nuclear reactor with bred uranium, thorium and make-up plutonium for a subsequent reactor cycle.

2. A method of fuel management for a nuclear reactor utilizing a thorium-uranium$^{233}$ breeding cycle for a plurality of fuel recycles, which method comprises charging the reactor with ceramic fuel units containing uranium and thorium, operating the reactor for the desired reactivity life of at least a selected portion of said fuel units, removing said selected portion of fuel units from the nuclear reactor, reprocessing said selected fuel units to eliminate fission products and to recover bred uranium, refueling the nuclear reactor with bred uranium, thorium and make-up plutonium, and operating the nuclear reactor for a subsequent reactor cycle at a conversion ratio of at least about 0.75.

3. A method of fuel management for a nuclear reactor utilizing a thorium-uranium$^{233}$ breeding cycle for a plurality of fuel recycles, which method comprises charging the reactor with graphite fuel elements containing uranium and thorium in ceramic form, said fuel elements forming the core of the nuclear reactor, operating the reactor until the reactor core has substantially reached equilibrium condition, removing a selected portion of the fuel elements from the nuclear reactor, reprocessing said selected fuel elements to eliminate fission products and to recover bred uranium, refueling the nuclear reactor with graphite fuel elements containing bred uranium, thorium and make-up plutonium, the composition of said replacement fuel elements being such that the ratio of carbon to thorium in said refueled reactor core is between about 125 to 1 and about 250 to 1, atoms of carbon to atoms of thorium, and operating the refueled nuclear reactor at a conversion ratio of at least about 0.75.

4. A method of fuel management for a nuclear reactor utilizing a thorium-uranium$^{233}$ breeding cycle for a plurality of fuel recycles, which method comprises charging the reactor with graphite fuel elements containing uranium and thorium in ceramic form and also containing ceramic beryllium material, said fuel elements forming the core of the nuclear reactor, operating the reactor until the reactor core has substantially reached equilibrium condition, removing a selected portion of the fuel elements from the nuclear reactor, reprocessing said selected fuel elements to eliminate fission products and to recover bred uranium, refueling the nuclear reactor with graphite fuel elements containing bred uranium, thorium, make-up plutonium and ceramic beryllium material, the composition of said replacement fuel elements being such that the ratio of beryllium to thorium in said refueled reactor core is equivalent to between about 25 to 55 atoms of beryllium for each atom of thorium when about 2.5 atoms of carbon are present for each atom of beryllium, and operating the refueled nuclear reactor at a conversion ratio of at least about 0.75.

5. A power-near breeder reactor operating on a thorium-uranium$^{233}$ breeding cycle and having a reactor core which has reached equilibrium condition, which reactor comprises a plurality of ceramic fuel elements containing ceramic nuclear fuel which fuel elements constitute the reactor core, said reactor achieving a conversion ratio of at least about 0.75, at least a portion of said fuel elements being replacement fuel elements which were introduced into the reactor core subsequent to the initial core loading, said replacement fuel elements containing uranium$^{233}$, thorium and plutonium, said plutonium being present in sufficient amount to provide the necessary enrichment to compensate for the conversion ratio of less than 1.0 whereby the reactor continues to operate at equilibrium conditions after refueling with said replacement fuel elements.

6. A gas-cooled near-breeder power reactor operating on a thorium-uranium$^{233}$ breeding cycle and having a reactor core which has reached equilibrium condition, which reactor comprises a plurality of graphite fuel elements containing ceramic nuclear fuel which fuel elements constitute the reactor core, said reactor achieving a conversion ratio of at least about 0.75, at least a portion of said fuel elements being replacement fuel elements which were introduced into the reactor core subsequent to the initial core loading, said replacement fuel elements containing uranium$^{233}$, thorium and plutonium, said plutonium being present in sufficient amount to provide the necessary enrichment to compensate for the conversion ratio of less than 1.0, the ratio of carbon to thorium in said reactor core being between about 125 to 1 and about 250 to 1, atoms of carbon to atoms of thorium, whereby the reactor continues to operate at equilibrium conditions after refueling with said replacement fuel elements.

7. A gas-cooled power reactor operating on a thorium-uranium$^{233}$ breeding cycle and having a reactor core which has reached equilibrium condition, which reactor comprises a plurality of ceramic fuel elements containing ceramic nuclear fuel and ceramic moderator of graphite and beryllium material, which fuel elements constitute the reactor core, said reactor achieving a conversion ratio of at least about 0.75, at least a portion of said fuel elements being replacement fuel elements which were introduced into the reactor core subsequent to the initial core loading, said replacement fuel elements containing uranium$^{233}$, thorium and plutonium, said plutonium being present in sufficient amount to provide the necessary enrichment to compensate for the conversion ratio of less than 1.0, the ratio of beryllium to thorium in said reactor core being equivalent to between about 25 to 55 atoms of beryllium for each atom of thorium when about 2.5 atoms of carbon are present for each atom of beryllium, whereby the reactor continues to operate at equilibrium conditions after refueling with said replacement fuel elements.

References Cited by the Examiner
UNITED STATES PATENTS

| | | | |
|---|---|---|---|
| 3,208,912 | 9/1965 | Jaye et al. | 176—30 |
| 3,230,151 | 1/1966 | Mills et al. | 176—73 |

CARL D. QUARFORTH, *Primary Examiner.*

L. DEWAYNE RUTLEDGE, *Examiner.*